United States Patent
Liu et al.

(10) Patent No.: US 9,098,305 B2
(45) Date of Patent: Aug. 4, 2015

(54) COMPUTER SYSTEM AND BOOTUP AND SHUTDOWN METHOD THEREOF

(75) Inventors: Chih-Chien Liu, Taipei (TW);
Feng-Hsun Chen, Taipei (TW);
Chien-Ting Yeh, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 445 days.

(21) Appl. No.: 13/118,492

(22) Filed: May 30, 2011

(65) Prior Publication Data
US 2011/0252225 A1    Oct. 13, 2011

Related U.S. Application Data

(60) Provisional application No. 61/349,901, filed on May 31, 2010.

(30) Foreign Application Priority Data

Apr. 13, 2010  (TW) .............................. 100112821 A

(51) Int. Cl.
*G06F 9/00* (2006.01)
*G06F 9/44* (2006.01)

(52) U.S. Cl.
CPC ............ *G06F 9/4418* (2013.01); *G06F 9/4401* (2013.01)

(58) Field of Classification Search
CPC .............................. G06F 9/4401; G06F 9/4408
USPC .......................................................... 713/1, 2
See application file for complete search history.

(56) References Cited

U.S. PATENT DOCUMENTS

| | | | |
|---|---|---|---|
| 5,721,936 A * | 2/1998 | Kikinis et al. ................ 713/323 |
| 2004/0088589 A1 * | 5/2004 | Westerinen et al. .......... 713/300 |
| 2004/0098350 A1 * | 5/2004 | Labrou et al. ................... 705/64 |
| 2004/0098578 A1 * | 5/2004 | Funayama ........................ 713/2 |
| 2005/0034003 A1 * | 2/2005 | Sato et al. ..................... 713/340 |
| 2007/0011443 A1 * | 1/2007 | Oura ................................. 713/1 |
| 2007/0022258 A1 * | 1/2007 | Panabaker et al. ............ 711/149 |
| 2007/0055860 A1 * | 3/2007 | Wang ................................ 713/2 |
| 2008/0091746 A1 * | 4/2008 | Hatasaki et al. .............. 707/204 |
| 2008/0168267 A1 * | 7/2008 | Bolen et al. .................... 713/100 |
| 2008/0215915 A1 * | 9/2008 | Zhou et al. ...................... 714/15 |
| 2008/0270783 A1 * | 10/2008 | Liao ................................. 713/2 |
| 2009/0006833 A1 * | 1/2009 | Yamada ............................ 713/2 |
| 2009/0178141 A1 * | 7/2009 | Panasyuk ........................ 726/24 |
| 2010/0100719 A1 * | 4/2010 | Chen et al. ........................ 713/2 |
| 2010/0180148 A1 * | 7/2010 | Hatasaki et al. ................. 714/4 |
| 2011/0055538 A1 * | 3/2011 | Cho et al. ......................... 713/2 |

FOREIGN PATENT DOCUMENTS

WO    WO 2005071531 A1 *   8/2005   ................ G06F 9/00

* cited by examiner

*Primary Examiner* — Jaweed A Abbaszadeh
*Assistant Examiner* — Phil Nguyen
(74) *Attorney, Agent, or Firm* — Jianq Chyun IP Office

(57) ABSTRACT

A computer system and a bootup and shutdown method thereof are provided. The computer system includes a memory, a chipset, a basic input/output system (BIOS), and an embedded controller, and an operating system (OS) is executed in the computer system. In the shutdown and bootup method, the embedded controller is notified to prepare to enter into a standby mode when the BIOS intercepts a shutdown instruction issued by the OS. The content of a register of the chipset is set according to the standby mode. A current operation mode data of the computer system is retained, and power is continuously supplied to the memory to make the computer system enter into the standby mode.

12 Claims, 7 Drawing Sheets

COMPUTER SYSTEM AND BOOTUP AND SHUTDOWN METHOD THEREOF

CROSS-REFERENCE TO RELATED APPLICATION

This application claims the priority benefits of U.S. provisional application Ser. No. 61/349,901, filed on May 31, 2010 and Taiwan application serial no. 100112821, filed on Apr. 13, 2011. The entirety of each of the above-mentioned patent applications is hereby incorporated by reference herein and made a part of this specification.

BACKGROUND OF THE INVENTION

1. Field of the Invention

The invention generally relates to a bootup and shutdown method of a computer system, and more particularly, to a bootup and shutdown method which can shorten bootup time and a computer system using the same.

2. Description of Related Art

Based on statistics, computer systems have been broadly used, and people have been getting more and more used to work, communicate, browse information, and enjoy their leisure time by using computer systems.

Generally speaking, after a user presses down the power switch of a computer system, the computer system has to go through a series of hardware initialization operations to be successfully started, wherein the basic input/output system (BIOS) plays a very important role. To be specific, after a computer system is powered on, its BIOS is loaded into the memory and executes a power on self test (POST) to initialize and test various hardware components of the computer system, so as to ensure that these hardware components can work properly. The POST includes initializing the central processing unit (CPU) of the computer system to check whether the flags and registers of the CPU are normal. The POST also includes checking the functions of the southbridge and the northbridge, detecting the memory and performing related settings, and initializing various peripheral devices (for example, keyboard, mouse, I/O ports, and sensors). After the POST is completed, a boot device is selected according to the boot order appointed by the user, and the operating system (OS) is then loaded to complete the entire boot process of the computer system.

Based on the advanced configuration and power interface (ACPI) specification, a typical shutdown process turns off all the devices (including the power supply). In this case, the computer system enters into a shutdown mode (e.g. ACPI S5 mode). When next time the computer system is to be booted up, the computer system needs to go through the entire boot process described above, which is very time consuming. Thereby, how to boot up a computer system quickly has become one of the major subjects in the industry.

SUMMARY OF THE INVENTION

Accordingly, the invention is directed to a bootup and shutdown method of a computer system, wherein the computer system can be boot up quickly.

The invention is directed to a computer system which can be boot up quickly.

The invention provides a bootup and shutdown method of a computer system. The computer system includes a memory, a chipset, a basic input/output system (BIOS), and an embedded controller, and an operating system (OS) is executed in the computer system. The memory may be a dynamic random access memory (DRAM) or a non-volatile memory (NVM). In the bootup and shutdown method, the embedded controller is notified to prepare the computer system to enter into a standby mode when the BIOS intercepts a shutdown instruction issued by the OS. Content of a register of the chipset is set according to the standby mode of the computer system. Current operation mode data of the computer system is retained, and power is continuously supplied to the memory to make the computer system enter into the standby mode.

According to an embodiment of the invention, the bootup and shutdown method further includes following steps after the step of continuously supplying power to the memory to make the computer system enter into the standby mode. When the computer system is powered on, whether a hardware change has been made on the computer system is determined. If no hardware change has been made on the computer system, the setting of the register of the chipset is restored by using the operation mode data in the memory. A monitor of the computer system is turned on. A validation procedure corresponding to a hard disk of the computer system is executed. The accuracy of initialization data of a local advanced programmable interrupt controller (local APIC) is checked. Thereafter, the OS is started.

According to an embodiment of the invention, the step of executing the validation procedure corresponding to the hard disk further includes following steps. The function of an interrupt service is checked. The accuracy of initialization data of a base address of an advanced host controller interface (AHCI) is checked. The function of an input/output interface of the hard disk is verified.

According to an embodiment of the invention, the bootup and shutdown method further includes following steps after the step of determining whether the hardware change has been made on the computer system. If the hardware change has been made, a complete power on self test (POST) is performed to power on the computer system.

According to an embodiment of the invention, the hardware change includes a memory change, a central processing unit (CPU) change, a peripheral device change (for example, a hard disk change, an extended card change, or a change between a wireless local area network (WLAN) and a 3G network), and a real time clock (RTC) power change.

According to an embodiment of the invention, the operation mode data of the computer system is retained in the memory, the memory is a DRAM, and the bootup and shutdown method further includes following steps after the step of continuously supplying power to the memory to make the computer system enter into the standby mode. Whether a time of the computer system remaining in the standby mode reaches a predetermined value is determined. If the time of the computer system remaining in the standby mode reaches the predetermined value, the operation mode data in the memory is written into a non-volatile storage device of the computer system, and a shutdown operation procedure of the computer system is executed.

According to an embodiment of the invention, the bootup and shutdown method further includes following steps after the step of powering on the computer system. Whether the operation mode data is stored in the memory is checked. If the operation mode data is not stored in the memory, whether the operation mode data is stored in the non-volatile storage device is determined. If the operation mode data is stored in the non-volatile storage device, the operation mode data is loaded into the memory.

The invention provides a computer system in which an OS is executed. The computer system includes a memory, a chipset, an embedded controller, and a BIOS. The chipset is coupled to the memory. The embedded controller is coupled to the chipset. The BIOS is coupled to the chipset or the embedded controller. When the BIOS intercepts a shutdown instruction issued by the OS, the BIOS notifies the embedded controller to prepare the computer system to enter into a standby mode through the chipset, sets a content of a register of the chipset according to the standby mode, retains current operation mode data of the computer system. Thereafter, the embedded controller maintains the supplied power to the memory when the computer system enters into the standby mode.

According to an embodiment of the invention, after the computer system is powered on, the BIOS determines whether a hardware change has been made on the computer system. If no hardware change has been made on the computer system, the BIOS restores a setting of the register of the chipset by using the operation mode data in the memory, turns on a monitor of the computer system, executes a validation procedure corresponding to a hard disk of the computer system, checks the accuracy of initialization data of a local APIC, and starts the OS.

According to an embodiment of the invention, when the BIOS executes the validation procedure corresponding to the hard disk of the computer system, the BIOS checks the function of an interrupt service, checks the accuracy of initialization data of a base address of an AHCI, and verifies the function of an input/output interface of the hard disk.

According to an embodiment of the invention, when the BIOS determines that the hardware change has been made on the computer system, the BIOS performs a complete POST to power on the computer system.

According to an embodiment of the invention, the hardware change includes a memory change, a CPU change, a peripheral device change (for example, a hard disk change, an extended card change, or a change between a WLAN and a 3G network), and a RTC power change.

According to an embodiment of the invention, the operation mode data of the computer system is retained in the memory, the memory is a DRAM, and the computer system further includes a non-volatile storage device coupled to the chipset. The embedded controller wakes up the computer system when the time of the computer system remaining in the standby mode reaches a predetermined value. The BIOS determines whether the computer system is waked up because the time of the computer system remaining in the standby mode reaches the predetermined value. If the computer system is waked up because the time of the computer system remaining in the standby mode reaches the predetermined value, the BIOS writes the operation mode data in the memory into the non-volatile storage device through the chipset and then notifies the embedded controller to shut down the computer system and a power supply thereof.

According to an embodiment of the invention, after powering on the computer system, the BIOS checks whether the operation mode data is stored in the memory. If the operation mode data is not stored in the memory, the BIOS determines whether the operation mode data is stored in the non-volatile storage device. If the operation mode data is stored in the non-volatile storage device, the BIOS loads the operation mode data into the memory through the chipset.

As described above, in the invention, when the OS of a computer system is turned off, the computer system is controlled to enter into the standby mode instead of the shutdown mode (e.g. ACPI S5 mode, in which all the devices are turned off), so that the previous operation mode data can be retained in the memory. Accordingly, next time the computer system can be boot up quickly by using the data stored in the memory.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
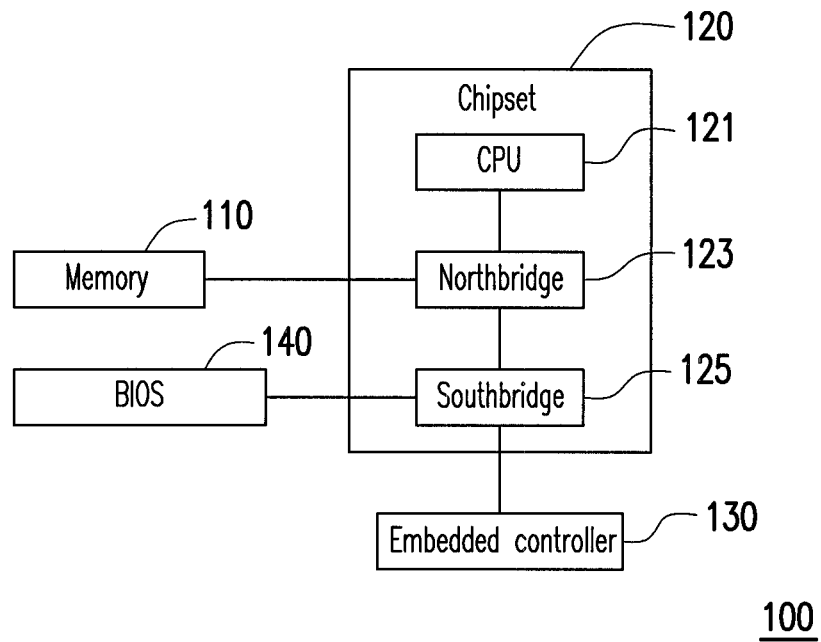
FIGS. 1A-1C are block diagrams of a computer system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1A is a block diagram of a computer system according to an embodiment of the invention. Referring to FIG. 1A, the computer system 100 includes a memory 110, a chipset 120, an embedded controller 130, and a basic input/output system (BIOS) 140. Besides, an operating system (OS) is executed in the computer system 100 when the computer system 100 is in operation.

The memory 110 may be a dynamic random access memory (DRAM) or a non-volatile memory (NVM). The memory 110 is the primary memory of the computer system 100. When the computer system 100 is in operation, various programs and data are loaded into the memory 110 to be executed and used by a central processing unit (CPU) 121 of the computer system 100.

In the present embodiment, the chipset 120 includes the CPU 121, a northbridge 123, and a southbridge 125. The memory 110 is coupled to the northbridge 123 of the chipset 120, and the embedded controller 130 and the BIOS 140 are coupled to the southbridge 125 of the chipset 120. The northbridge 123 and the southbridge 125 communicate with each other through peripheral components. The northbridge 123 transmits signals between the CPU 121, the memory 110, and a peripheral component interconnect bus, while the southbridge 125 controls other peripheral devices.

The embedded controller 130 controls input devices (for example, a keyboard (not shown)) of the computer system 100 and manages the power supply thereof.

The BIOS 140 may be program codes stored in a read-only memory (ROM, now shown) on the motherboard (not shown) of the computer system 100. In the present embodiment, the BIOS 140 further executes a special mechanism when the computer system 100 is shut down, so as to make the computer system 100 enter into a standby mode. The standby mode is, for example, the advanced configuration and power interface (ACPI) S3 mode. Besides, when next time the computer system 100 is boot up, the complete power on self test (POST) is skipped so that the time for booting up the computer system 100 can be shortened.

Figure 1B:
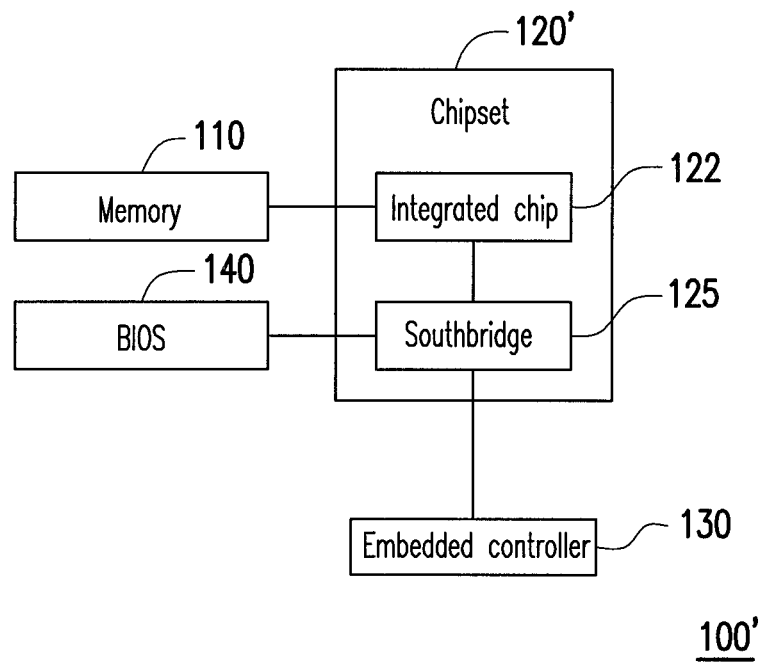

FIG. 1B is a block diagram of a computer system according to another embodiment of the invention. The computer system 100' in the present embodiment is similar to the computer system 100 illustrated in FIG. 1A, and only the differences between the two will be described herein. As shown in FIG. 1B, the chipset 120' of the computer system 100' includes an integrated chip 122 and a southbridge 125, wherein a CPU and a northbridge are integrated into the integrated chip 122. The memory 110 is coupled to the integrated chip 122 of the chipset 120', and the embedded controller 130 and the BIOS 140 are coupled to the southbridge 125 of the chipset 120. Except the coupling differences mentioned above, the functions of various components of the computer system 100' are the same as those of the corresponding components of the computer system 100 therefore will not be described herein.

Figure 1C:
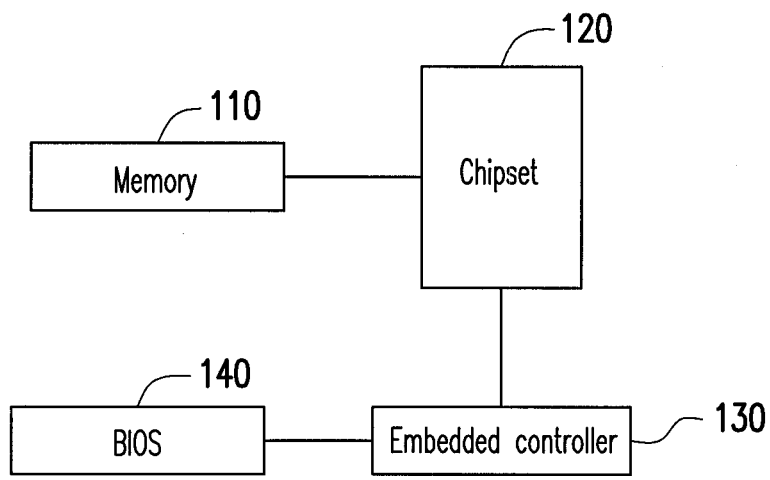

It should be noted that in other embodiments of the invention, the BIOS 140 may also be coupled to the embedded controller 130 (as in the computer system 100" illustrated in FIG. 1C).

Figure 2:
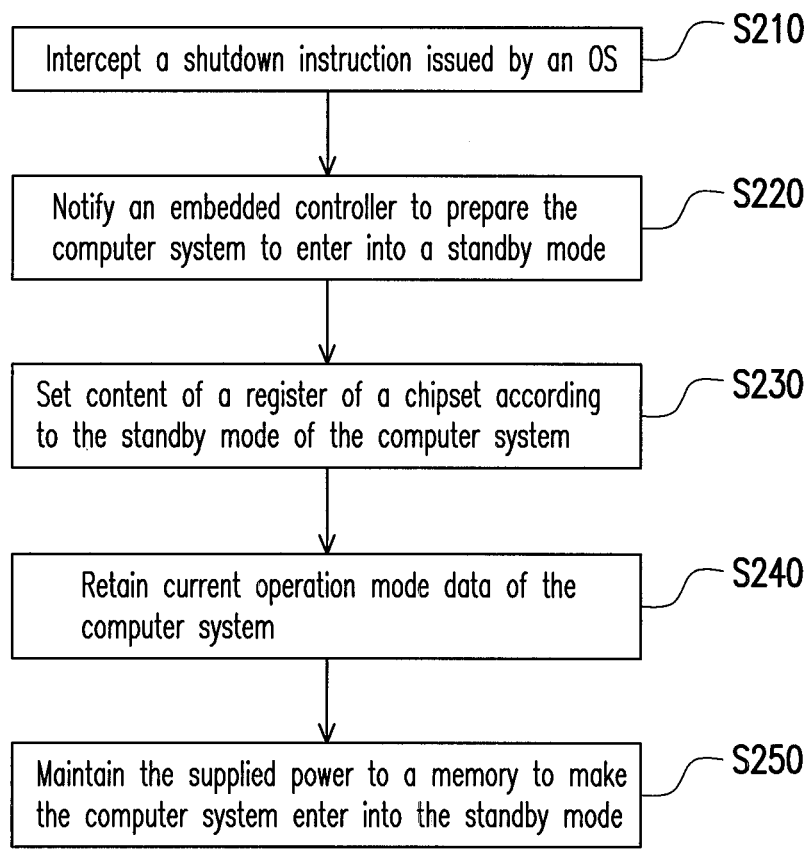
FIG. 2 is a flowchart of a shutdown method of a computer system according to an embodiment of the invention.

The operation of the BIOS 140 when the computer system 100 is shut down will be described in detail with reference to another embodiment of the invention. FIG. 2 is a flowchart of a shutdown method of a computer system according to an embodiment of the invention. Please refer to both FIG. 1A and FIG. 2.

When the computer system 100 is working and a user presses down the "power on" button on the desktop or the key combination of "Ctrl+Alt+Del" and then selects the "Turn off the computer" option, in step S210, the BIOS 140 intercepts a shutdown instruction issued by the OS.

Then, in step S220, the BIOS 140 notifies the embedded controller 130 to prepare the computer system 100 to enter into the standby mode. To be specific, the BIOS 140 notifies the embedded controller 130 to turn off an indicator of the standby mode by setting a flag of the embedded controller 130, so that the embedded controller 130 can understand that the computer system 100 is entering the standby mode.

Next, in step S230, the BIOS 140 sets the content of one or more related registers in the chipset 120 according to the standby mode of the computer system 100. In the present embodiment, the BIOS 140 sets the contents of related registers of the southbridge 125 in the chipset 120. When the OS is entering the shutdown mode (e.g. ACPI S5 mode), it writes related settings into the registers in the chipset 120 and then the chipset 120 changes its state. Thus, in order to prevent the chipset 120 from actually entering the shutdown mode, the BIOS 140 changes the contents of the registers into settings related to the standby mode.

In step S240, current operation mode data of the computer system 100 is retained (e.g., retained in the memory 110). In the last step S250, the embedded controller 130 controls a power supply circuit to maintain the supplied power to the memory 110, so as to retain the operation mode data stored therein and make the computer system 100 enter into the standby mode.

It should be mentioned that in the present embodiment, the chipset 120 and the embedded controller 130 are notified to enter into the standby mode instead of the shutdown mode by the BIOS 140, and the behaviour of the OS itself does not change. Thus, the OS still considers that the computer system 100 is about to enter into the shutdown mode. In other words, the mode and data of the OS are the same as those of the OS when the computer system 100 enters into the shutdown mode.

The operations of various components of the computer system 100 when next time the user is about to turn on the computer system 100 will be described in detail with reference to FIG. 3.

First, in step S310, the user presses down the power switch of the computer system 100 to power on the power supply of the computer system 100. In an embodiment, the BIOS 140 determines whether the computer system 100 has gone through the steps illustrated in FIG. 2 when last time the computer system 100 is shut down by reading a flag of the embedded controller 130 or some other NVM. If the flag indicates that the computer system 100 is previously shut down through a conventional procedure, the BIOS 140 performs a complete POST to boot up the computer system 100. Namely, in this case, all the hardware devices have to be initialized.

However, if the flag indicates that the computer system 100 enters into the standby mode instead of the shutdown mode when last time it is shut down, in step S320, the BIOS 140 determines whether any hardware change has been made when the computer system 100 stays in the standby mode. The hardware change may be one or a combination of a memory change (for example, replacing or expanding a memory), a CPU change (for example, replacing a CPU), a peripheral device change (for example, a hard disk change, different extended card change, or a change between a wireless local area network (WLAN) and a 3G network), and a real time clock (RTC) power change (for example, replacing the battery of a RTC chip).

To be specific, if a memory change or RTC power change has been made, the current model of the related hardware differs from that recorded in the memory 110, and if a memory change has been made, the previously stored operation mode data may be lost. Accordingly, when the BIOS 140 determines that a hardware change has been made on the computer system 100, in step S330, the BIOS 140 performs a complete POST (initializes all hardware devices) to boot up the computer system 100.

However, if no hardware change has been made on the computer system 100, in step S340, the BIOS 140 restores the settings of related registers in the chipset 120 by using the operation mode data in the memory 110.

In addition, the BIOS 140 still initializes some hardware devices. To be specific, in step S350, because data related to a monitor (e.g. a video graphics array (VGA) display, not shown) of the computer system 100 is not stored in the memory 110 but in a chip and a memory of the monitor itself, the BIOS 140 may turn on the monitor by initializing the VBIOS/DXE driver of the monitor.

Next, in step S360, in order to read the hard disk (not shown) of the computer system 100, the BIOS 140 executes a validation procedure corresponding to the hard disk. For example, the BIOS 140 checks the interrupt controller to determine whether a function of an interrupt service (e.g. an INT 13 interrupt service) is normal. Besides, if the computer system 100 supports an advanced host controller interface (AHCI), the BIOS 140 also checks whether an initialization data of a base address of the AHCI is correct. The BIOS 140 also sends an instruction to the hard disk through an input/output interface of the hard disk, so as to determine whether the input/output interface of the hard disk functions well.

Additionally, because data related to a local advanced programmable interrupt controller (local APCI) of the CPU of the computer system 100 is stored in the CPU and no power is supplied to the CPU when the computer system 100 is in the standby mode, in order to ensure that the local APIC can properly handle interrupts of the CPU when the computer system 100 is in operation, in step S370, the BIOS 140 checks the accuracy of initialization data of the local APIC.

In the last step S380, the OS is loaded and started to complete the boot procedure the computer system 100.

Figure 3:
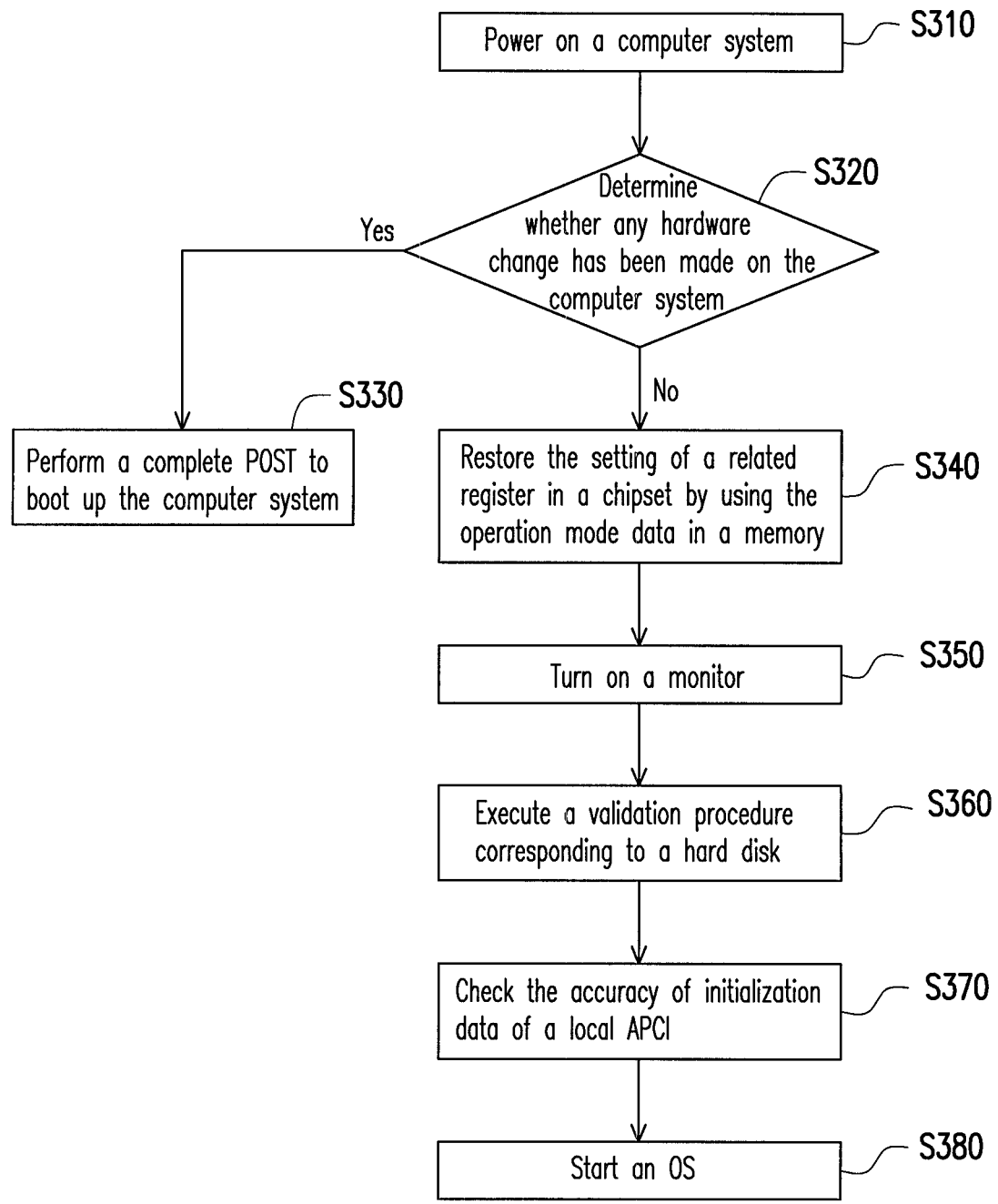
FIG. 3 is a flowchart of a bootup method of a computer system according to an embodiment of the invention.

In the embodiment illustrated in FIG. 2 and FIG. 3, when the computer system 100 is to be shut down, the BIOS 140 notifies the chipset 120 and the embedded controller 130 and controls the computer system 100 to enter into the standby mode instead of the shutdown mode, and the BIOS 140 retains the current operation mode data. Since power is continuously supplied to the memory 110 when the computer system 100 is in the standby mode, the operation mode data in the memory 110 can be retained. When next time the computer system 100 is to be turned on, the settings of registers in the chipset 120 is quickly restored by using the operation mode data recorded in the memory 110, so that the OS is loaded to complete the boot procedure after testing only some of the hardware devices.

Even though various steps of the bootup and shutdown method provided by the invention are described in foregoing embodiment with reference to FIG. 2 and FIG. 3 by taking the computer system 100 illustrated in FIG. 1A as an example, the computer system 100' illustrated in FIG. 1B and the computer system 100" illustrated in FIG. 1C can also execute the steps illustrated in FIG. 2 and FIG. 3.

Figure 4A:
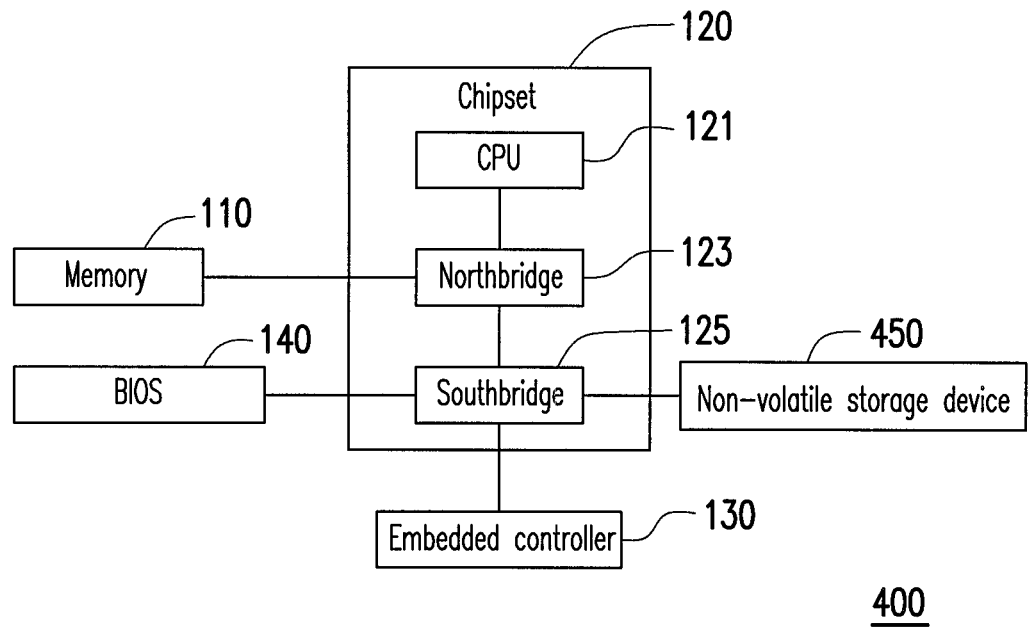
FIGS. 4A-4C are block diagrams of a computer system according to another embodiment of the invention.

FIG. 4A is a block diagram of a computer system according to another embodiment of the invention. Referring to FIG. 4, the computer system 400 includes a memory 110, a chipset 120, an embedded controller 130, a BIOS 140, and a non-volatile storage device 450. In the present embodiment, the memory 110 is a DRAM. The chipset 120, the embedded controller 130, and the BIOS 140 have the same or similar functions as those of the computer system 100 illustrated in FIG. 1A therefore will not be described herein.

The non-volatile storage device 450 is coupled to the southbridge 125 of the chipset 120. The non-volatile storage device 450 may be a hard disk, a flash memory, or any other storage device which won't lose the data stored therein when a power supply is terminated.

Figure 4B:
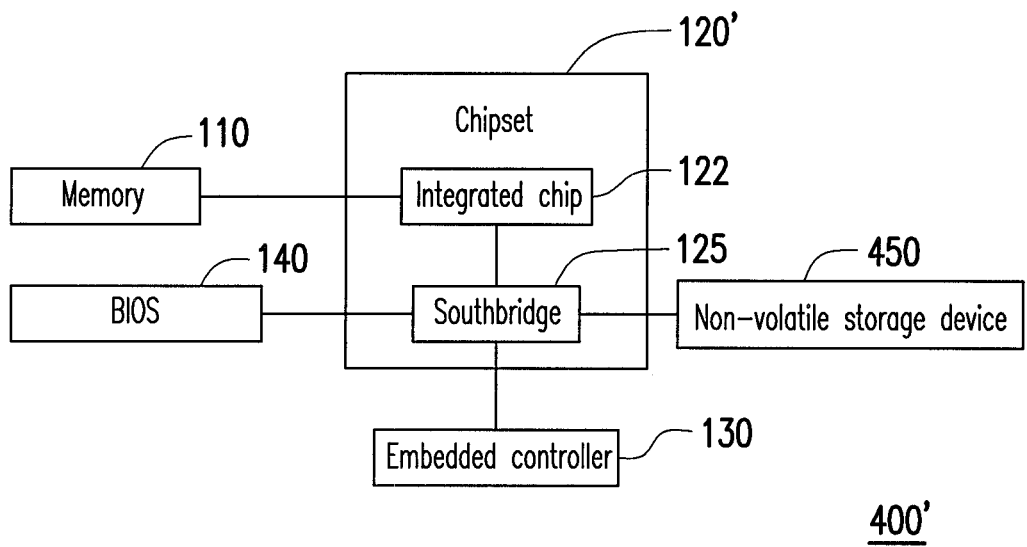

FIG. 4B is a block diagram of a computer system according to another embodiment of the invention. The computer system 400' in FIG. 4B has a similar structure as the computer system 400 in FIG. 4A, and the difference between the two computer systems is that the CPU and northbridge in the chipset 120' of the computer system 400' are integrated into an integrated chip 122, while the CPU 121, the northbridge 123, and the southbridge 125 in the chipset 120 of the computer system 400 are independent components.

Figure 4C:
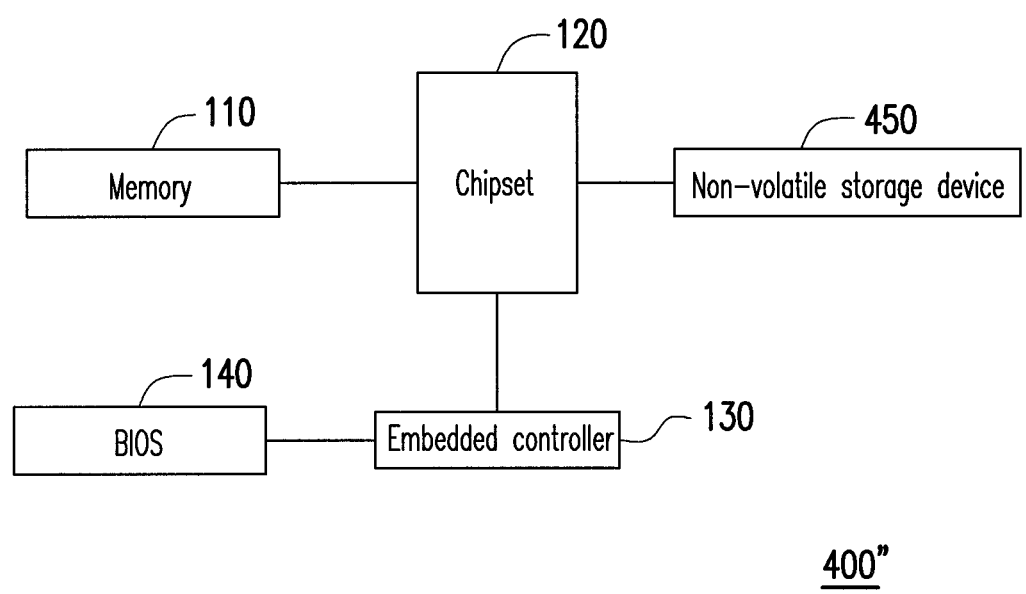

FIG. 4C is a block diagram of a computer system according to another embodiment of the invention. As shown in FIG. 4C, the BIOS 140 is not connected to the chipset 120 (unlike that shown in FIGS. 4A and 4B). In the present embodiment, the BIOS 140 is connected to the embedded controller 130.

Figure 5:
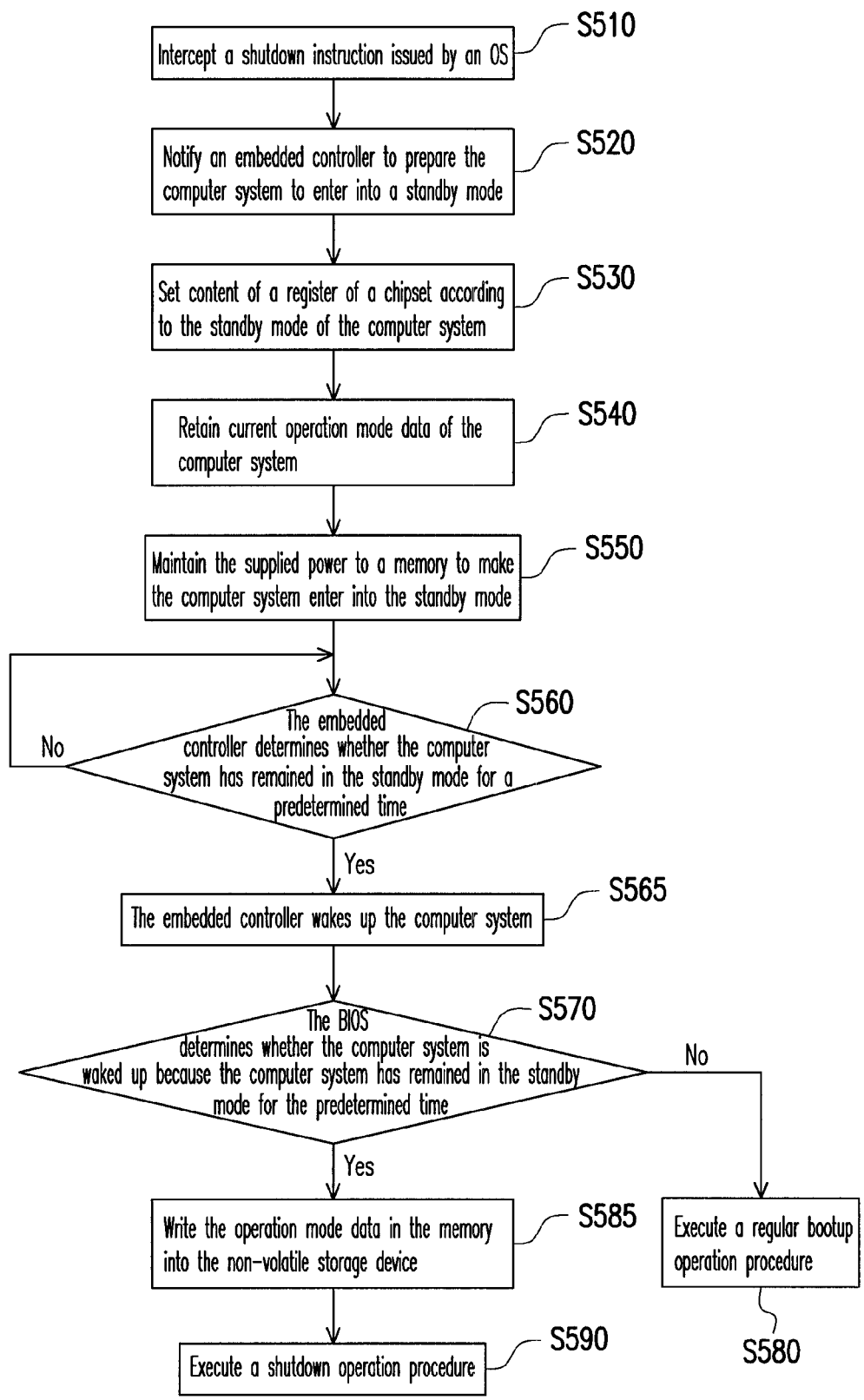
FIG. 5 is a flowchart of a shutdown method of a computer system according to another embodiment of the invention.

Below, the procedure for shutting down the computer system 400 will be described in detail with reference to FIG. 4A and FIG. 5. The steps S510-S550 in FIG. 5 are the same as or similar to the steps S210-S250 in FIG. 2 therefore will not be described herein.

When the computer system 400 enters into the standby mode through steps S510-S550, the memory 110 receives the power supply. However, in order to reduce the power consumption, in the present embodiment, in step S560, the embedded controller 130 repeatedly determines whether the computer system 400 has remained in the standby mode for a predetermined time, wherein the predetermined time may be 24 hours but the invention is not limited thereto.

If the embedded controller 130 determines that the computer system 400 has remained in the standby mode for the predetermined time, in step S565, the embedded controller 130 wakes up the computer system 400. In step S570, the BIOS 140 determines whether the computer system 400 is waked up because the computer system 400 has remained in the standby mode for the predetermined time.

If the computer system 400 is waked up not because the computer system 400 has remained in the standby mode for the predetermined time, in step S580, a regular bootup operation procedure is executed.

If the computer system 400 is waked up because the computer system 400 has remained in the standby mode for the predetermined time, in step S585, the BIOS 140 writes the operation mode data in the memory 110 into the non-volatile storage device 450, and in step S590, the BIOS 140 executes a shutdown operation procedure of the computer system 400. Namely, the BIOS 140 notifies the embedded controller 130 to shut down the computer system 400 and the power supply. In this case, the power consumption is further reduced. Besides, the operation mode data originally recorded in the memory 110 won't be lost since it is written into the non-volatile storage device 450.

Figure 6:
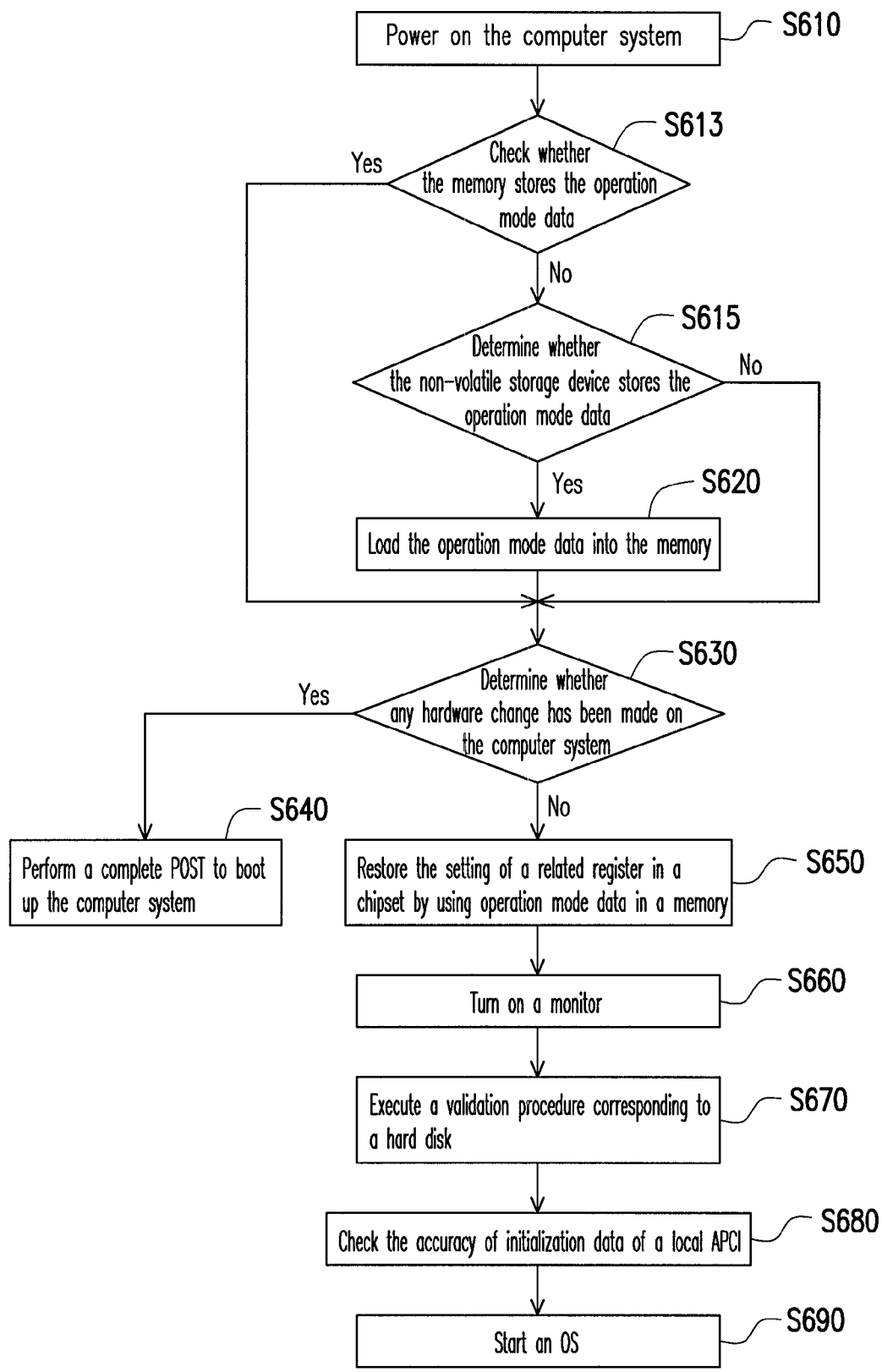
FIG. 6 is a flowchart of a bootup method of a computer system according to another embodiment of the invention.

FIG. 6 is a flowchart of a bootup method of the computer system 400 according to another embodiment of the invention. Since steps in FIG. 6 are approximately the same as those in FIG. 3, only the differences between the two embodiments will be explained herein.

After powering on the computer system 400 (i.e., the power supply of the computer system 400 is turned on) in step S610, in step S613, the BIOS 140 checks whether the memory 110 stores any operation mode data. If the memory 110 stores no operation mode data, in step S615, whether the non-volatile storage device 450 stores any operation mode data is determined.

If the non-volatile storage device 450 stores operation mode data (i.e., the computer system 400 has remained in the standby mode for over the predetermined time), in step S620, the BIOS 140 loads the operation mode data from the non-volatile storage device 450 into the memory 110.

Then, in steps S630-S690, when no hardware change has been made on the computer system 400, the computer system 400 is quickly boot up by using the operation mode data in the memory 110.

If it is determined in step S613 that the memory 110 stores the operation mode data or in step S615 that the non-volatile storage device 450 does not store the operation mode data, steps S630-S690 in the bootup method of the computer system 400 are also executed in the present embodiment.

In the embodiment described above, the computer system 400 is also controlled to enter into the standby mode instead of the shutdown mode, and the operation mode data is retained in the memory 110 when the computer system 400 is to be shut down. However, once the time of the computer system 400 remaining in the standby mode exceeds a predetermined value, the operation mode data in the memory 110 is stored into a non-volatile storage device 450 which retains data even with no power supply, so that the power consumption can be reduced.

Even though various steps of the bootup and shutdown method provided by the invention is described in foregoing embodiment with reference to FIG. 5 and FIG. 6 by taking the computer system 400 illustrated in FIG. 4A as an example, the computer system 400' illustrated in FIG. 4B and the computer system 400" illustrated in FIG. 4C can also execute the steps in FIG. 5 and FIG. 6.

In summary, the invention provides a computer system and a bootup and shutdown method thereof. According to the invention, when a computer system is to be shut down, the computer system is controlled to enter into the standby mode instead of the shutdown mode so that the current operation mode data can be stored in the memory. When subsequently the computer system is to be boot up again, the boot procedure can be speed up by using the data stored in the memory. When the computer system is boot up, whether any hardware change has been made on the computer system is determined. If a hardware change has been made when the computer system is in the standby mode, the computer system is boot up through the original boot procedure so as to ensure that the computer system can be properly boot up.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A bootup and shutdown method of a computer system, wherein the computer system comprises a memory, a chipset, an embedded controller, and a basic input/output system (BIOS), and only one operating system (OS) is executed in the computer system, the bootup and shutdown method comprising:

every time the BIOS intercepts a shutdown instruction issued by the only one OS, notifying the embedded controller to prepare the computer system to enter into a standby mode except the only one OS and to prepare the only one OS to enter into a shutdown mode without rebooting the computer system;

setting a content of at least one register of the chipset by the BIOS according to the standby mode of the computer system and the shutdown mode of the only one OS;

retaining a current operation mode data except OS data in the memory of the computer system;

letting the only one OS enter into the shutdown mode and continuously supplying power to the memory to make the computer system enter into the standby mode without rebooting the computer system;

powering on the computer system;

determining whether a hardware change has been made on the computer system;

if no hardware change has been made on the computer system, restoring a setting of the at least one register of the chipset by using the operation mode data in the memory;

turning on a monitor of the computer system;

executing a validation procedure corresponding to a hard disk of the computer system;

checking accuracy of an initialization data of a local advanced programmable interrupt controller (local APIC); and starting the only one OS.

2. The bootup and shutdown method according to claim 1, wherein the step of executing the validation procedure corresponding to the hard disk further comprises:

checking a function of an interrupt service;

checking accuracy of an initialization data of a base address of an advanced host controller interface (AHCI); and verifying a function of an input/output interface of the hard disk.

3. The bootup and shutdown method according to claim 1, wherein after the step of determining whether the hardware change has been made on the computer system, the bootup and shutdown method further comprises:

if the hardware change has been made on the computer system, performing a complete power on self test (POST) to power on the computer system.

4. The bootup and shutdown method according to claim 1, wherein the hardware change comprises a memory change, a central processing unit (CPU) change, a peripheral device change, and a real time clock (RTC) power change.

5. The bootup and shutdown method according to claim 1, wherein the operation mode data of the computer system is retained in the memory, the memory is a dynamic random access memory (DRAM), and after the step of continuously supplying power to the memory to make the computer system enter into the standby mode, the bootup and shutdown method further comprises:

determining whether a time of the computer system remaining in the standby mode reaches a predetermined value;

when the time of the computer system remaining in the standby mode reaches the predetermined value, writing the operation mode data in the memory into a non-volatile storage device of the computer system; and executing a shutdown operation procedure of the computer system.

6. The bootup and shutdown method according to claim 5, wherein after the step of powering on the computer system, the bootup and shutdown method further comprises:

checking whether the operation mode data is stored in the memory;

if the operation mode data is not stored in the memory, determining whether the operation mode data is stored in the non-volatile storage device; and if the operation mode data is stored in the non-volatile storage device, loading the operation mode data into the memory.

7. A computer system, executing only one operating system (OS), the computer system comprising:

a memory;

a chipset, coupled to the memory;

an embedded controller, coupled to the chipset; and a BIOS, coupled to the chipset or the embedded controller, wherein every time the BIOS intercepts a shutdown instruction issued by the only one OS, the BIOS notifies the embedded controller to prepare the computer system to enter into a standby mode except the only one OS and to prepare the only one OS to enter into a shutdown mode through the chipset without rebooting the computer system, sets a content of at least one register of the chipset according to the standby mode of the computer system and the shutdown mode of the only one OS, retains a current operation mode data except OS data in the memory of the computer system, and lets the only one OS enter into the shutdown mode, and the embedded controller maintains the supplied power to the memory to make the computer system enter into the standby mode without rebooting the computer system, and after powering on the computer system, the BIOS determines whether a hardware change has been made on the computer system, if no hardware change has been made on the computer system, the BIOS restores a setting of the at least one register of the chipset by using the operation mode data in the memory, turns on a monitor of the computer system, executes a validation procedure corresponding to a hard disk of the computer system, checks accuracy of an initialization data of a local APIC, and starts the only one OS.

8. The computer system according to claim 7, wherein when the BIOS executes the validation procedure corresponding to the hard disk of the computer system, the BIOS checks a function of an interrupt service, checks accuracy of an initialization data of a base address of an AHCI, and verifies a function of an input/output interface of the hard disk.

9. The computer system according to claim 7, wherein when the BIOS determines that the hardware change has been made on the computer system, the BIOS performs a complete POST to power on the computer system.

10. The computer system according to claim 7, wherein the hardware change comprises a memory change, a CPU change, a peripheral device change, and a RTC power change.

11. The computer system according to claim 7, wherein the operation mode data of the computer system is retained in the memory, the memory is a DRAM, and the computer system further comprises:

a non-volatile storage device, coupled to the chipset, wherein the embedded controller wakes up the computer system when a time of the computer system remaining in the standby mode reaches a predetermined value, the BIOS determines whether the computer system is waked up because the time of the computer system remaining in the standby mode reaches the predetermined value, wherein when the computer system is waked up because the time of the computer system remaining in the standby mode reaches the predetermined value, the BIOS writes the operation mode data in the memory into the non-volatile storage device through the chipset and notifies the embedded controller to shut down the computer system and a power supply.

12. The computer system according to claim 11, wherein after powering on the computer system, the BIOS checks whether the operation mode data is stored in the memory, if the operation mode data is not stored in the memory, the BIOS deter mines whether the operation mode data is stored in the non-volatile storage device, if when the operation mode data is stored in the non-volatile storage device, the BIOS loads the operation mode data into the memory through the chipset.

* * * * *